(12) United States Patent
Douglas et al.

(10) Patent No.: US 9,396,233 B2
(45) Date of Patent: Jul. 19, 2016

(54) ALERT MANAGEMENT

(71) Applicant: INTERNATIONAL BUSINESS MACHINES CORPORATION, Armonk, NY (US)

(72) Inventors: Clinton Douglas, Charlotte, NC (US); Stephen M. Leonard, Colorado Springs, CO (US); Todd D. Robinson, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 13/801,218

(22) Filed: Mar. 13, 2013

(65) Prior Publication Data

US 2014/0280383 A1    Sep. 18, 2014

(51) Int. Cl.
*G06F 17/30* (2006.01)

(52) U.S. Cl.
CPC ................ *G06F 17/30507* (2013.01)

(58) Field of Classification Search
None
See application file for complete search history.

(56) References Cited

U.S. PATENT DOCUMENTS

| | | | |
|---|---|---|---|
| 5,257,386 A * | 10/1993 | Saito .................. | G06F 9/54 711/151 |
| 6,631,519 B1 | 10/2003 | Nicholson et al. | |
| 7,299,240 B1 * | 11/2007 | Crozier | |
| 2004/0225637 A1 * | 11/2004 | Heinzel et al. .................. | 707/1 |
| 2007/0214111 A1 * | 9/2007 | Jin et al. .......................... | 707/3 |

OTHER PUBLICATIONS

Dell Latitude D600 2003, Dell Inc., http://www.dell.com/downloads/global/products/latit/en/spec_latit_d600_en.pdf.*
Data stating area—Google Search Jun. 13, 2015, Google, https://www.google.com/?gws_rd=ssl#q=data+staging+area.*
Datta et al, Oracle(R) Fusion Middleware Developers Guide for Oracle Identity Manager 11g Release 1 (11.1.1.6) Section 12.3.2.2 Reconciliation Field Mappings Tab Dec. 2011, Oracle, http://docs.oracle.com/cd/E23943_01/doc.1111/e14309/promgt.htm#BCEGDBJI.*
PCard Statement Reconciliation—PeopleSoft Financials 2015, Nothern Arizona University, https://nau.edu/its/learn/psfinancials/pcard_statement_reconcil/.*

(Continued)

*Primary Examiner* — Jason Liao
(74) *Attorney, Agent, or Firm* — Edward J. Lenart; John R. Pivnichny; Kennedy Lenart Spraggins LLP

(57) ABSTRACT

Alert management may include receiving, by a monitoring module from one or more disparate monitored sources, an alert, where the alert is a data structure that includes a plurality of fields; storing, by the monitoring module, the alert in a database; processing, by the monitoring module periodically at predefined intervals, the database, including identifying, in dependence upon a predefined ruleset, one or more alerts; storing, by the monitoring module, the identified alerts in a staging table, including creating, for each of the identified alerts, a primary key in dependence upon the fields of the identified alert; populating, by the monitoring module for each of the alerts stored in the staging table, one or more attribute fields of the alert in dependence upon the created primary key of the alert; and storing, by the monitoring module, the populated alerts in the database.

20 Claims, 2 Drawing Sheets

(56) References Cited

OTHER PUBLICATIONS

Using Custom Fields to Help You Prepare for Cost Basis Reconciliation, Aug. 30, 2012, Charles Schwab & Co., https://schwabpt.com/downloads/docs/pdflibrary/spt011901.pdf.*

Rielau et al., Why Current Timestamp produces poor primary keys Feb. 29, 2012, IBM developerWorks, https://www.ibm.com/developerworks/community/blogs/SQLTips4DB2LUW/entry/current_timestamp?lang=en.*

DuPaul, Man in the Middle (MITM) Attack [date unknown], http://www.veracode.com/security/man-middle-attack.*

Bourret, R., et al., "A Generic Load/Extract Utility for Data Transfer Between XML Documents and Relational Databases", Proceedings of the Second International Workshop on Advance Issues of E-Commerce and Web-Based Information Systems (WECWIS) Jun. 2000: "Advanced Issues of E-Commerce and Web-based Information Systems", pp. 134-143, IEEE Computer Society, Washington, DC, USA.

Abu-Hamdeh, R., et al., "Schema Translation Using Structural Transformation", Proceedings of the 1994 Conference of the Centre for Advanced Studies on Collaborative Research (CASCON), Nov. 1994, pp. 202-215, IBM Press, USA.

\* cited by examiner

ALERT MANAGEMENT

BACKGROUND OF THE INVENTION

1. Field of the Invention

The field of the invention is data processing, or, more specifically, methods, apparatus, and products for alert management.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today are often coupled with many other computer systems through a data communications network. In some environments, many computer systems, components of the computer systems, or components of a data center, may be monitored for potential remedial action. In such an environment, many disparate sources may send events or potential alerts to a single monitoring agent which may also be coupled, upstream, to a ticket queuing agent. The monitoring agent may receive alerts from the monitored systems and pass along the alerts to the ticket queuing agent. The ticket queuing agent may generate and issue a ticket describing a particular issue which is to be addressed by a system administrator. In some instances, however, alerts provided to the monitoring agent may not include an identifier or the monitoring agent may be unable to utilize the provided identifier. In such cases today, the monitoring agent passes the alert along to the ticket queuing system where the ticket queuing agent utilizes a static lookup table to identify the alert and process the alert. Such processing though takes place far upstream from the source and also utilizes a static lookup table. Such a static lookup table is somewhat inflexible and resource intensive. What is needed therefore is means by which alerts having no identifier or an unusable identifier may be processed closer to the source and without utilization of a static lookup table at the ticket queuing system.

SUMMARY

Methods, apparatus, and products for alert management are disclosed in this specification. Alert management may include receiving, by a monitoring module from one or more disparate monitored sources, an alert, where the alert includes a data structure that includes a number of fields; storing, by the monitoring module, the alert in a database; processing, by the monitoring module periodically at predefined intervals, the database, including identifying, in dependence upon a predefined ruleset, one or more alerts; storing, by the monitoring module, the identified alerts in a staging table, including creating, for each of the identified alerts, a primary key in dependence upon the fields of the identified alert; populating, by the monitoring module for each of the alerts stored in the staging table, one or more attribute fields of the alert in dependence upon the created primary key of the alert; and storing, by the monitoring module, the populated alerts in the database.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
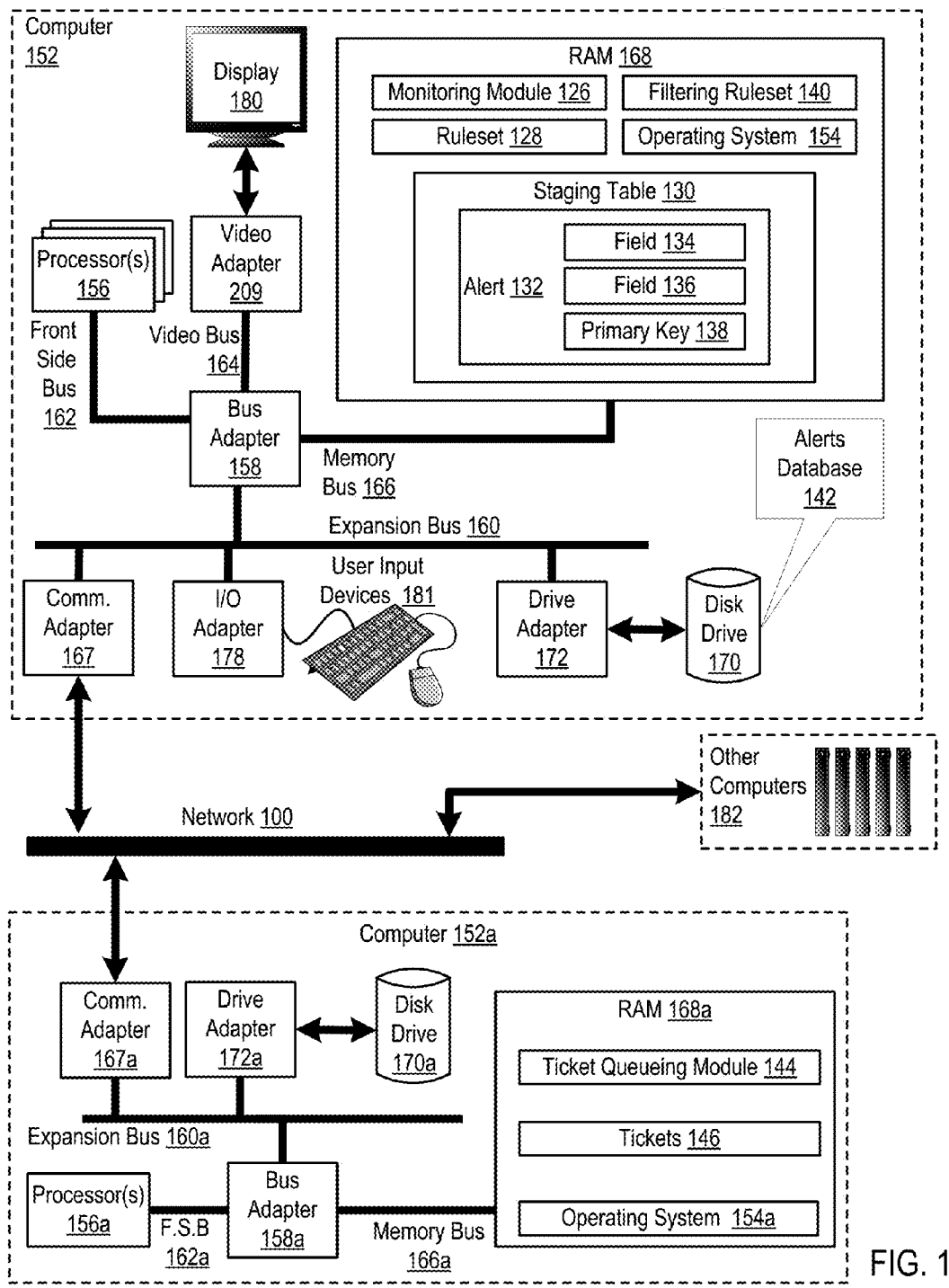
FIG. 1 sets forth a network diagram of an example system for alert management according to embodiments of the present invention.

Exemplary methods, apparatus, and products for alert management in accordance with the present invention are described with reference to the accompanying drawings, beginning with FIG. 1. FIG. 1 sets forth a network diagram of an example ticket queuing system for alert management according to embodiments of the present invention. A 'ticket' (146) as the term is used in this specification is a data structure representing an issue to be addressed by a system administrator or IT (information technology) professional.

The system of FIG. 1 includes several examples of automated computing machinery. One example of automated computing machinery includes the computer (152) which is configured for alert management according to embodiments of the present invention. The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

Stored in RAM (168) is a monitoring module (126), a module of computer program instructions configured for monitoring various disparate computing systems and computing system components. The monitoring module (126) may, in addition to other operations, receive one or more events or alerts from other monitored computers (182) or computing components through a data communications network (100). At a high level, the monitoring module stores the events and alerts and passes some of the events and alerts along to a ticket queuing module (144) for further processing and ticket queuing.

The monitoring module (126) of FIG. 1 may also be configured for alert management according to embodiments of the present invention. Such alert management may include receiving, from one or more disparate monitored sources (182), an alert (132). The alert in the example of FIG. 1 may be a data structure that includes a plurality of fields (134, 136). Each field may include a descriptor of the alert.

After receiving the alert (132), the monitoring module may store the alert in a database (142). The database (142) may comprise any number of tables or other data structures useful in storing alerts or other events.

The monitoring module (126) may also be configured to periodically at predefined intervals, process the database (142). Such processing may include identifying one or more alerts stored in the database (142) based on a predefined ruleset. Such a ruleset may include a set of rules specifying criteria for identification of alerts in the database. Further, such a ruleset may be implemented as a virtual table, rather than a persistent table, where the virtual table is configured to be emptied or destroyed entirely upon a system shutdown. This is in contrast to a persistent table which is configured to remain in memory even after a system shutdown.

Once identified, the monitoring module (126) may store the identified alerts in a staging table (130). A staging table may be created for the purpose of storing the alerts, then destroyed at a later time as described below. In storing the identified alerts in a staging table (130), the monitoring module may create, for each of the identified alerts, a primary key (138) in dependence upon the fields of the identified alert. The term 'primary key' as used in this specification refers to an identifier. Readers of skill in the art will recognize that the fields (134, 136) may be used to form the identifier in various ways. In one example, the values of the fields may be concatenated to form the primary key.

The monitoring module (126) may then, in dependence upon the created primary keys, populate one or more attribute fields of the alert. Each attribute field may further describe the alert. In some embodiments the attribute fields are useful in filtering alerts to be sent to the ticket queuing module (144). Examples of such fields may include a field describing the alert's impact, a field describing the alert's urgency, a field including an indication of whether to pass the alert along to a ticketing module for queuing, and so on.

Once the monitoring module (126) has populated the attribute fields of the alerts in the staging table (130), the monitoring module may store the populated alerts in the database (142). In ticket queuing systems such as the example provided in FIG. 1, the monitoring module may then periodically identify one or more alerts stored in the database (142) to provide to the ticket queuing module (144) in dependence upon filtering criteria (not shown here) and the attribute fields of the alerts stored in the database.

In some embodiments, the monitoring module (126) determines whether an alert stored in the database (142) is to be sent along in dependence upon a field indicating whether to pass the alert along to the ticketing module. Such a field may, for example, have one of three values:

- a value of zero, meaning the alert is not to be passed along to the ticket queuing module (144);
- a value of one, meaning the alert is to be passed along to the ticket queuing module (144) with values of the attribute fields being populated by the monitoring module; or
- a value of two, meaning the alert is to be passed along to the ticket queuing module with default attribute field values. In such an embodiment, the ticket queuing module (144) may perform a lookup in a persistent table in order to aid in ticket generation.

The ticket queuing module (144) in the example of FIG. 1 is depicted as a module of computer program instructions stored in RAM (168) of a second computer (152a). Each of the components of the computer (152a) are similar to that of the monitoring module's computer (152). For purposes of brevity, the description of components below is directed primarily to that of the computer (152), but can be also applied to the components of computer (152a).

Also stored RAM (168, 168a) of each computer (152, 152) is an operating system (154, 154a). Operating systems useful alert management according to embodiments of the present invention include UNIX™, Linux™, Microsoft XP™, AIX™, IBM's i5/OS™, and others as will occur to those of skill in the art. The operating systems (154, 154a), monitoring module (126), ticket queuing module (144) in the example of FIG. 1 are shown in RAM (168), but many components of such software typically are stored in non-volatile memory also, such as, for example, on a disk drive (170, 170a).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for alert management according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for alert management according to embodiments of the present invention include modems for wired dial-up communications, Ethernet (IEEE 802.3) adapters for wired data communications, and 802.11 adapters for wireless data communications.

Although the example of FIG. 1 sets forth a ticket queuing system, Readers of skill in the art will recognize that alert management in accordance with embodiments of the present invention need not be limited to ticket queuing systems. Further, the arrangement of computers and other devices making up the exemplary system illustrated in FIG. 1 are for explanation, not for limitation. Data processing systems useful according to various embodiments of the present invention may include additional databases, servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
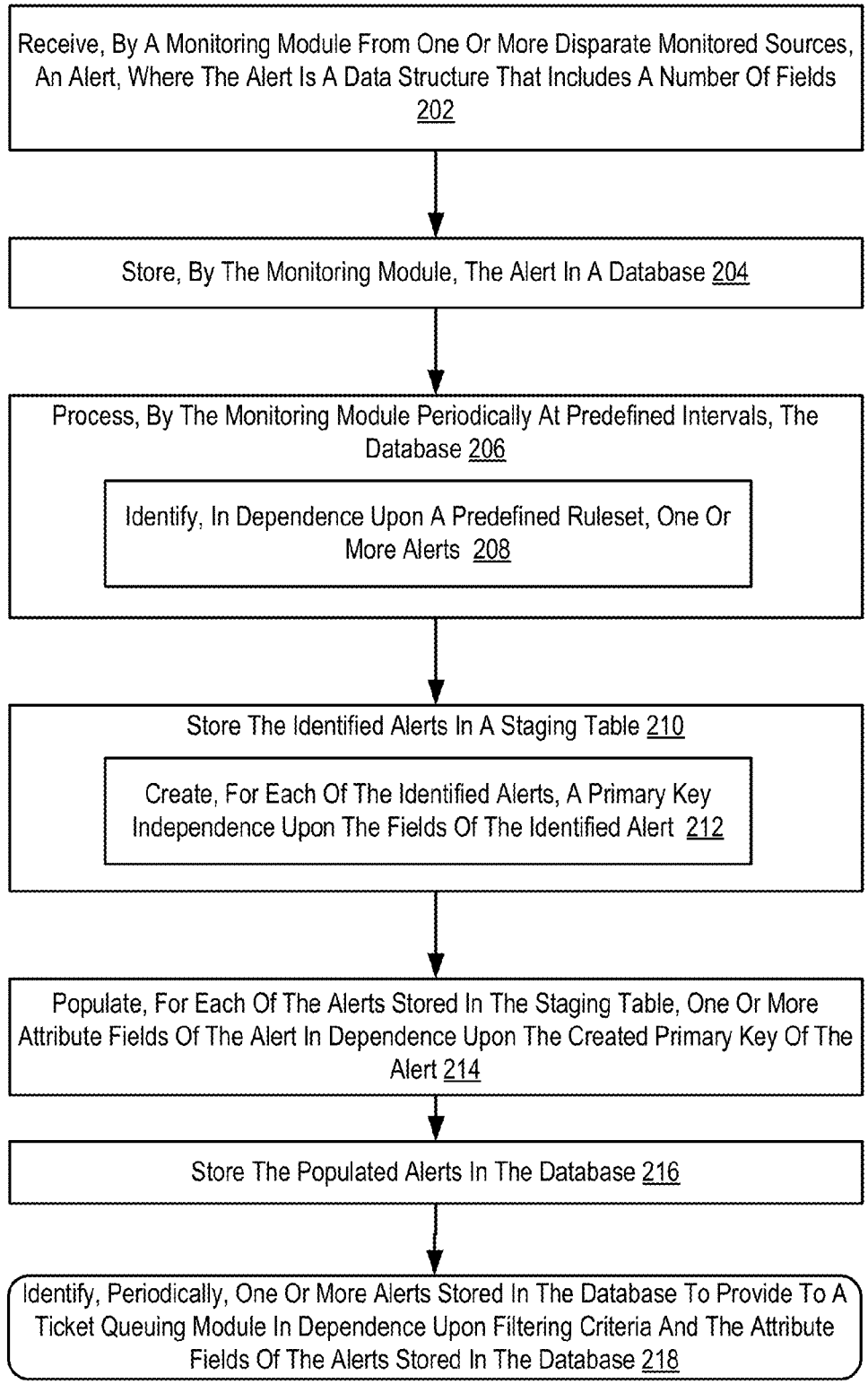
FIG. 2 sets forth a flow chart illustrating an exemplary method for alert management according to embodiments of the present invention.

For further explanation, FIG. 2 sets forth a flow chart illustrating an exemplary method for alert management according to embodiments of the present invention. The method of FIG. 2 may be carried out in a ticket queuing system similar to the system depicted in the example of FIG. 1. Readers of skill in the art will recognize, however, that portions of the method of FIG. 2 may useful in systems other than ticket queuing systems.

The method of FIG. 2 includes receiving (202), by a monitoring module from one or more disparate monitored sources, an alert. In the method of FIG. 2, the alert is a data structure that includes a plurality of fields. Such fields may include descriptions of the alert, an identification of the source of the alert, a timestamp identifying a time of generation of the alert, and so on as will occur to readers of skill in the art. Receiving (202) an alert may be carried out in a variety of ways, including, for as one example, receiving a data communications message from an alert source where the message is formed and send in accordance with SNMP (Simple Network Management Protocol).

The method of FIG. 2 also includes storing (204), by the monitoring module, the alert in a database. The monitoring module may store the alert in the database in number of different ways. The monitoring module may, for example, store each alert in a separate table, store all alerts in a single table, or in other ways as will occur to readers of skill in the art.

The method of FIG. 2 also includes processing (206), by the monitoring module periodically at predefined intervals, the database. In the method of FIG. 2, processing (206) the database includes identifying (208), in dependence upon a predefined ruleset, one or more alerts. That is, processing (206) the database may be carried out periodically by iteratively (or in parallel) querying the database for alerts that include criteria satisfying one or more rules of the ruleset A ruleset as mentioned above is a set of rules specifying criteria for identification of alerts in the database. Such rules may include, for example, a specification of alerts having a particular source identifier, a specification of alerts having a particular alert type, a specification of alerts having a particular timestamp, some combination of these criteria, and others as will occur to readers of skill in the art. Such a ruleset may be user-defined and modified from time to time with the addition of different alert types or different alert sources.

The method of FIG. 2 also includes storing (210), by the monitoring module, the identified alerts in a staging table. In the method of FIG. 2, storing (210) the identified alerts in a staging table includes creating (212), for each of the identified alerts, a primary key) in dependence upon the fields of the identified alert. A primary key, as mentioned above, is an identifier of the alert. Creating (212) such a primary key may be carried out in various ways, including for example, by concatenating one or more values of fields of an alert.

The method of FIG. 2 also includes populating (214), by the monitoring module for each of the alerts stored in the staging table, one or more attribute fields of the alert in dependence upon the created primary key of the alert. In embodiments, in which the method of FIG. 2 is carried out in a ticket queuing system, the attribute fields of the alert may include any combination of: a field describing the alert's impact; a field describing the alert's urgency; and a field comprising an indication of whether to pass the alert along to a ticketing module for queuing.

Populating (214), by the monitoring module for each of the alerts stored in the staging table, one or more attribute fields of the alert in dependence upon the created primary key of the alert may include populating the attribute fields with values stored in a user-defined data population source. Such a user-defined data population source may be tailored and modified from time to time by a user. As such, the user-defined data population source may be very flexible compared to a persistent table at a ticket generation module.

The method of FIG. 2 also includes storing (216), by the monitoring module, the populated alerts in the database. That is, once the alerts are populated, the alerts are stored back in the database.

In embodiments in which the method of FIG. 2 is implemented in a ticket queuing system, the method of FIG. 2 also includes identifying (218), periodically, one or more alerts stored in the database to provide to a ticket queuing module in dependence upon filtering criteria and the attribute fields of the alerts stored in the database. In some embodiments, the attribute indicating whether to pass along the alert to the ticket queuing module may utilized to identify the alerts to pass along. In this way, alert processing may be carried out closer to the source of the alert, thereby reducing number of events and alerts passed along to the ticket queuing module. Such a reduction also reduces the amount of filtering and processing which occurs at the ticket queuing module. Further, the systems described above provide flexibility in that the ruleset may be a virtual table that can be modified (or expanded) at any time by a user and the population source may also be modified or tailored at any time by a user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of alert management, the method comprising:
receiving, by a monitoring module, from one or more disparate monitored computer system hardware component sources, an alert, wherein the alert comprises a data structure that includes a plurality of fields, the monitoring module logically disposed between the monitored sources and a ticket queuing module, wherein the monitoring module is automated computing machinery;
storing, by the monitoring module, the alert in a database;
processing, by the monitoring module periodically at predefined intervals, the database, including identifying, in dependence upon a predefined ruleset, one or more alerts, the ruleset comprising a specification of a combination of a source identifier, an alert type, and a timestamp;
storing, by the monitoring module, the identified alerts in a staging table, including creating, for each of the identified alerts, a primary key in dependence upon the fields of the identified alert;
populating, by the monitoring module for each of the alerts stored in the staging table, one or more attribute fields of the alert in dependence upon the created primary key of the alert, wherein the attribute fields comprise a field comprising one selected from the group consisting of:
a value indicating the alert is not to be passed along to the ticket queueing module,
a value indicating the alert is to be passed along to the ticket queuing module with values of the attribute fields populated by the monitoring module, and
a value indicating the alert is to be passed along to the ticket queuing module with attribute fields populated with default values from corresponding attribute fields of a persistent table; and
storing, by the monitoring module, the populated alerts in the database for later selection and issuance as system maintenance tickets by the ticket queuing module,
whereby all of receiving an alert, storing the alert in a database, processing the database, storing identified alerts in a staging table, populating fields, and storing populated alerts are carried out first in an overall process of alert and ticket processing, before the occurrence of any further selection for or issuance as system maintenance tickets.

2. The method of claim 1 wherein the monitoring module comprises a module of a ticket queuing system.

3. The method of claim 2 further comprising identifying, periodically, one or more alerts stored in the database to provide to a ticket queuing module in dependence upon filtering criteria and the attribute fields of the alerts stored in the database.

4. The method of claim 2 wherein the attribute fields comprise one or more of:
   a field describing the alert's impact; and
   a field describing the alert's urgency.

5. The method of claim 1 wherein the staging table comprises a virtual table configured to be cleared upon a system shut down.

6. The method of claim 1 wherein the ruleset is user-defined.

7. The method of claim 1 wherein populating one or more attribute fields of the alert in dependence upon the created primary key of the alert further comprises populating the attribute fields with values stored in a user-defined data population source.

8. An apparatus for alert management, the apparatus comprising a computer processor, a computer memory operatively coupled to the computer processor, the computer memory having disposed within it computer program instructions that, when executed by the computer processor, cause the apparatus to carry out the steps of:
   receiving, by a monitoring module, from one or more disparate monitored computer system hardware component sources, an alert, wherein the alert comprises a data structure that includes a plurality of fields, the monitoring module logically disposed between the monitored sources and a ticket queuing module, wherein the monitoring module is automated computing machinery;
   storing, by the monitoring module, the alert in a database;
   processing, by the monitoring module periodically at predefined intervals, the database, including identifying, in dependence upon a predefined ruleset, one or more alerts, the ruleset comprising a specification of a combination of a source identifier, an alert type, and a timestamp;
   storing, by the monitoring module, the identified alerts in a staging table, including creating, for each of the identified alerts, a primary key in dependence upon the fields of the identified alert;
   populating, by the monitoring module for each of the alerts stored in the staging table, one or more attribute fields of the alert in dependence upon the created primary key of the alert, wherein the attribute fields comprise a field comprising one selected from the group consisting of:
      a value indicating the alert is not to be passed along to the ticket queueing module,
      a value indicating the alert is to be passed along to the ticket queuing module with values of the attribute fields populated by the monitoring module, and
      a value indicating the alert is to be passed along to the ticket queuing module with attribute fields populated with default values from corresponding attribute fields of a persistent table; and
   storing, by the monitoring module, the populated alerts in the database for later selection and issuance as system maintenance tickets by the ticket queuing module,
   whereby all of receiving an alert, storing the alert in a database, processing the database, storing identified alerts in a staging table, populating fields, and storing populated alerts are carried out first in an overall process of alert and ticket processing, before the occurrence of any further selection for or issuance as system maintenance tickets.

9. The apparatus of claim 8 wherein the monitoring module comprises a module of a ticket queuing system.

10. The apparatus of claim 9 further comprising computer program instructions that, when executed, cause the apparatus to carry out the step of identifying, periodically, one or more alerts stored in the database to provide to a ticket queuing module in dependence upon filtering criteria and the attribute fields of the alerts stored in the database.

11. The apparatus of claim 9 wherein the attribute fields comprise one or more of:
   a field describing the alert's impact; and
   a field describing the alert's urgency.

12. The apparatus of claim 8 wherein the staging table comprises a virtual table configured to be cleared upon a system shut down.

13. The apparatus of claim 8 wherein the ruleset is user-defined.

14. The apparatus of claim 8 wherein populating one or more attribute fields of the alert in dependence upon the created primary key of the alert further comprises populating the attribute fields with values stored in a user-defined data population source.

15. A computer program product for alert management, the computer program product disposed upon a non-transitory computer readable medium, the computer program product comprising computer program instructions that, when executed, cause a computer to carry out the steps of:
   receiving, by a monitoring module, from one or more disparate monitored computer system hardware component sources, an alert, wherein the alert comprises a data structure that includes a plurality of fields, the monitoring module logically disposed between the monitored sources and a ticket queuing module, wherein the monitoring module is automated computing machinery;
   storing, by the monitoring module, the alert in a database;
   processing, by the monitoring module periodically at predefined intervals, the database, including identifying, in dependence upon a predefined ruleset, one or more alerts, the ruleset comprising a specification of a combination of a source identifier, an alert type, and a timestamp;
   storing, by the monitoring module, the identified alerts in a staging table, including creating, for each of the identified alerts, a primary key in dependence upon the fields of the identified alert;
   populating, by the monitoring module for each of the alerts stored in the staging table, one or more attribute fields of the alert in dependence upon the created primary key of the alert, wherein the attribute fields comprise a field comprising one selected from the group consisting of:
      a value indicating the alert is not to be passed along to the ticket queueing module,
      a value indicating the alert is to be passed along to the ticket queuing module with values of the attribute fields populated by the monitoring module, and
      a value indicating the alert is to be passed along to the ticket queuing module with attribute fields populated with default values from corresponding attribute fields of a persistent table; and
   storing, by the monitoring module, the populated alerts in the database for later selection and issuance as system maintenance tickets by the ticket queuing module,
   whereby all of receiving an alert, storing the alert in a database, processing the database, storing identified alerts in a staging table, populating fields, and storing populated alerts are carried out first in an overall process of alert and ticket processing, before the occurrence of any further selection for or issuance as system maintenance tickets.

16. The computer program product of claim 15 wherein the monitoring module comprises a module of a ticket queuing system.

17. The computer program product of claim 16 further comprising computer program instructions that, when executed, cause the computer to carry out the step of identifying, periodically, one or more alerts stored in the database to provide to a ticket queuing module in dependence upon filtering criteria and the attribute fields of the alerts stored in the database.

18. The computer program product of claim 16 wherein the attribute fields comprise one or more of:
- a field describing the alert's impact; and
- a field describing the alert's urgency.

19. The computer program product of claim 15 wherein the staging table comprises a virtual table configured to be cleared upon a system shut down.

20. The computer program product of claim 15 wherein populating one or more attribute fields of the alert in dependence upon the created primary key of the alert further comprises populating the attribute fields with values stored in a user-defined data population source.

\* \* \* \* \*